United States Patent [19]

Miller

[11] Patent Number: 4,597,068
[45] Date of Patent: Jun. 24, 1986

[54] ACOUSTIC RANGING SYSTEM
[75] Inventor: Gabriel L. Miller, Westfield, N.J.
[73] Assignee: AT&T Bell Laboratories, Murray Hill, N.J.
[21] Appl. No.: 487,154
[22] Filed: Apr. 21, 1983
[51] Int. Cl.⁴ ............................ G01S 15/10; G01S 7/52
[52] U.S. Cl. ............................................ 367/87; 310/317; 367/903; 367/137
[58] Field of Search ................ 367/87, 137, 138, 140, 367/903; 310/317

[56] References Cited
U.S. PATENT DOCUMENTS

| | | | |
|---|---|---|---|
| 2,562,450 | 7/1951 | De Lano, Jr. ................ | 310/317 X |
| 3,296,589 | 1/1967 | Ikrath .......................... | 367/903 X |
| 3,731,201 | 5/1973 | Fisbie .......................... | 325/105 |
| 3,985,030 | 10/1976 | Charlton ...................... | 73/290 |
| 4,197,539 | 4/1980 | Suzuki ......................... | 343/17.1 R |
| 4,199,245 | 4/1980 | Muggli ........................ | 354/195 |
| 4,282,452 | 8/1981 | Hassler et al. ............... | 367/137 X |
| 4,369,455 | 1/1983 | McConica et al. .......... | 310/317 X |

Primary Examiner—Richard A. Farley
Attorney, Agent, or Firm—Jack S. Cubert

[57] ABSTRACT

An acoustic transducer is connected to an electronically controllable time-dependent conductance so that energy may be rapidly applied to and extracted from the transducer and associated circuitry.

12 Claims, 9 Drawing Figures

ACOUSTIC RANGING SYSTEM

BACKGROUND OF THE INVENTION

The invention relates to acoustic ranging and, more particularly, to improved arrangements for close proximity ranging.

Acoustic ranging permits the determination of distance to a target without physical contact. Such systems typically operate in two successive cycles or modes. In the transmit mode, an ultrasonic pulse (an acoustic wave above about 20 kHz) is propagated toward a target at an unknown distance. In the receive mode, the reflected sound energy or echo from the target is detected. The time between the generation of the transmit pulse and receipt of the echo is proportional to the target range.

The SX-70 brand cameras made by Polaroid Corporation, Cambridge, Mass., are an example of commercial products which incorporate ultrasonic ranging. The Polaroid ranging device comprises a capacitive transducer which doubles as a transmitter and receiver. This dual-function design is advantageously compact and economical.

In prior dual-function transducer systems, accurate ranging is limited to a minimum distance of about 1 foot. This is largely due to the time required for the transducer and associated driving circuitry to return to a quiescent state after the transmit cycle. There are many promising applications for ultrasonic ranging, however, in which it is desirable to accurately measure much shorter distances. In the field of robotics, for example, shortrange sensors have useful potential for feedback control.

It is therefore an object of the invention to provide an acoustic arrangement for close proximity ranging.

SUMMARY OF THE INVENTION

The invention is an acoustic ranging system including a resonant circuit and a transducer operative in transmit and receive cycles of the system. Means for controlling the resonant circuit includes means for driving the transducer to produce acoustic waves and means for actively extracting energy in order to dampen this circuit and transducer to a quiescent state.

DETAILED DESCRIPTION

Figure 1:
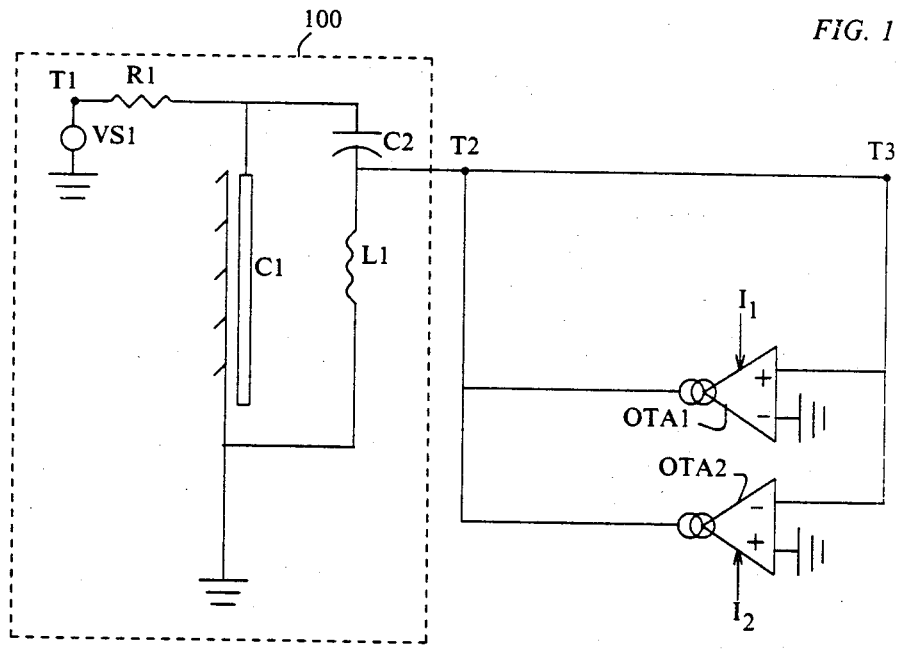
FIG. 1 is a schematic diagram of a circuit illustrative of the invention.

Referring to FIG. 1, box 100, an LC tank or resonant circuit comprises capacitor C2 connected in series with inductor L1. Capacitor C2 may be about 0.05 microfarads and inductor L1 may be about 10 millihenries. A capacitive transducer C1, typically of about 500 picofarads, is connected in series with capacitor C2 and inductor L1. The transducer C1 may be, for example, the Polaroid ultrasonic ranging element. The metallized face of transducer C1 is connected to ground. This grounding arrangement is particularly advantageous in providing electromagnetic shielding. The other side of transducer C1 is connected via resistor R1 to terminal T1. A bias voltage $V_B$ of, for example, about 200 volts DC may be applied to terminal T1 by a voltage source VS1.

Figure 6:
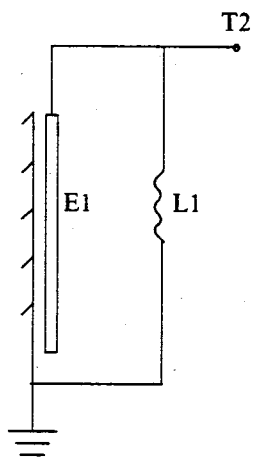
FIG. 6 is a schematic diagram of an alternative transducer arrangement useful in the embodiment of FIG. 1.

Other types of well-known transducers, such as an electret, may be substituted for the arrangement shown in box 100 of FIG. 1. Referring to FIG. 6, one terminal of electret E1 is connected to one side of the inductor L1 and terminal T2. The other terminal of the electret is connected to the other side of the inductor and ground.

In FIG. 1, the junction of capacitor C2 and inductor L1 is connected to a time-dependent conductance circuit at terminal T2. The conductance circuit comprises amplifiers OTA1 and OTA2. Amplifiers OTA1 and OTA2 may be type CA3080A operational transconductance amplifier circuits made by Radio Corporation of America, Incorporated. The amplifiers are connected to voltage supplies (not shown), as is well known in the art. Bias currents $I_1$ and $I_2$ are applied at predetermined times to the control terminals of amplifiers OTA1 and OTA2, respectively.

Figure 4:
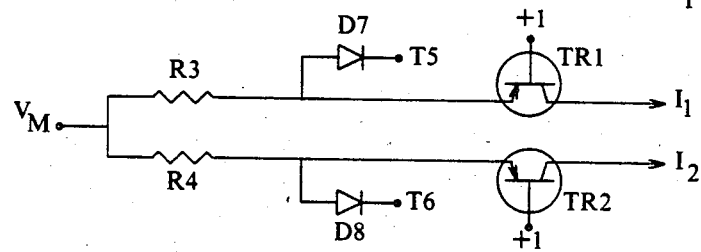
FIG. 4 is a schematic diagram of a controllable current source circuit useful in the embodiments of FIGS. 1 and 3.

Currents $I_1$ and $I_2$ may be supplied by a controllable current source arrangement, as shown in FIG. 4. A constant voltage $V_M$ is applied to one side of resistors R3 and R4. $V_M$ may be, for example, about +8 volts. Resistors R3 and R4 may, for example, be about 20 K ohms. The other side of resistor R3 is connected to the anode of diode D7 and the emitter of transistor TR1. The other side of resistor R4 is connected to the anode of diode D8 and the emitter of transistor TR2. The cathodes of diodes D7 and D8 are connected to terminals T5 and T6, respectively. The bases of transistors TR1 and TR2 are connected to a positive voltage of, for example, about 1 volt.

A TTL type signal, well known in the art, may be applied alternately to terminals T5 and T6. Transistors TR1 provides ouput current $I_1$ (equal to about ⅓ ma) at its collector when a true TTL signal is applied to terminal T5. A true signal may be about +4 volts. Transistor TR2 is operative to output current $I_2$ at its collector when a true signal is applied to terminal T6. When false signals (about 0 volts) are applied to terminals T5 and T6, currents $I_1$ and $I_2$ are zero. It is to be understood that other controllable current source arrangements may be substituted for the above arrangement, as is well known in the art.

As shown in FIG. 1, the positive input terminal of amplifier OTA1 may be connected directly to terminal T2 for positive feedback operation. Similarly, the negative input terminal of amplifier OTA2 may be connected directly to terminal T2 for negative feedback operation. It is preferable, however, to include protective circuitry in the feedback loops to limit the voltages applied to the amplifier inputs. The protective circuit may be substituted for the direct connection shown between terminals T2 and T3 in FIG. 1.

Figure 8:
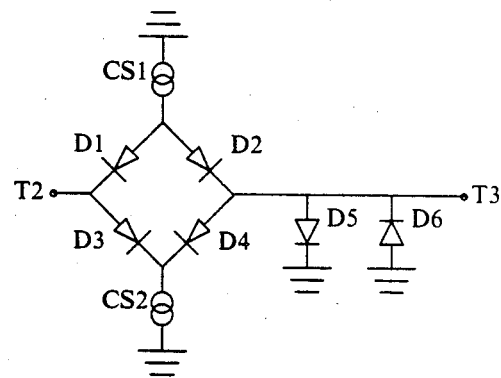
FIG. 8 is a schematic diagram of a protective circuit useful in the embodiments of FIGS. 1 and 3.

The protective circuit may comprise, for example, a diode arrangement as shown in FIG. 8. In FIG. 8, the anodes of diodes D1 and D2 are connected to a positive current source CS1. Current source CS1 may comprise, for example, a transistor connected in a common-base configuration, as is well known in the art. Current source CS1 supplies a constant current $I_0$ equal to, for example, about 0.1 ma. The cathode of diode D1 and the anode of diode D3 are connected to terminal T2. The cathodes of diodes D2 and D6, and the anodes of diodes D4 and D5 are connected to terminal T3 and the positive and negative input terminals of amplifiers OTA1 and OTA2, respectively. The cathodes of diodes D3 and D4 are connected to negative current source CS2, which supplies a constant current $-I_0$. The cathode of diode D5 and the anode of diode D6 are connected to ground. This diode arrangement limits the voltage applied to the amplifiers to a safe range of about $\pm 0.7$ volts. Advantageously, the driving potential to transducer C1 (the voltage at terminal T2) may range about $\pm 10$ volts. The ouput power of the transducer is thereby enhanced. It is to be understood that the other protective circuitry may be provided within the scope and spirit of the invention.

Figure 2:
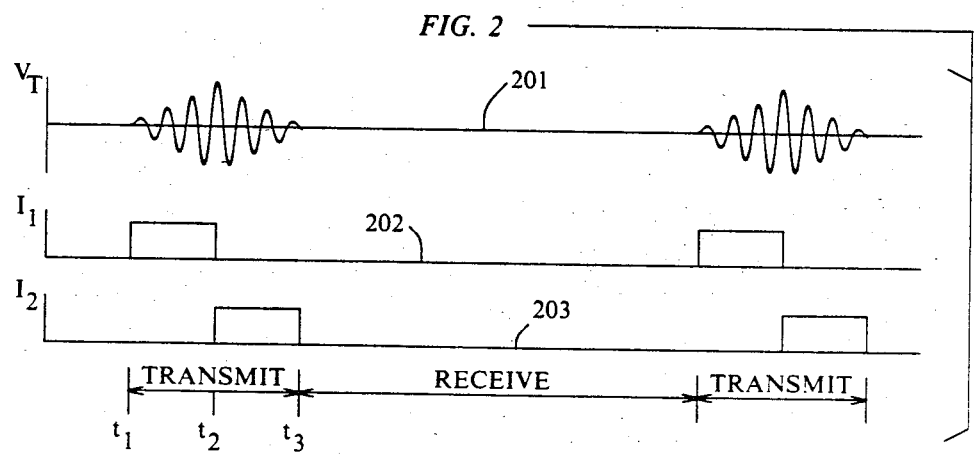
FIG. 2 is a set of graphs showing operating waveforms of the circuit of FIG. 1.

Operation of the circuit in FIG. 1 is illustrated by the graphs in FIG. 2. Graphs 202 and 203 in FIG. 2 show the waveforms of bias currents I1 and I2 applied to amplifiers OTA1 and OTA2, respectively. Graph 201 shows the resulting voltage response $V_T$ of the resonant circuit with respect to time. The voltage response $V_T$ may be obtained at terminal T2.

In order to drive acoustic transducer C1, current I1 is switched on at time $t_1$. Since OTA1 is connected for positive feedback, the amplitude of resonant circuit voltage response $V_T$ rapidly builds up at the resonant frequency. The amplitude of the acoustic pressure wave generated by capacitive transducer C1 builds up correspondingly. Current I1 remains on for a predetermined period of time, for example, 30 $\mu$sec, at which point $V_T$ reaches a maximum of about 20 volts peak-to-peak.

In order to damp the ultrasonic transducer C1, current I1 is switched off and current I2 is switched on at time $t_2$. Amplifier OTA1 therefore returns to a high impedance state and amplifier OTA2 is energized. Since OTA2 is connected for negative feedback, energy is extracted from the resonant circuit. The oscillations of transducer C1 are thereby arrested and the amplitude of resonator circuit voltage $V_T$ declines rapidly to zero.

At time $t_3$ in FIG. 2, currents I1 and I2 are both off and transducer C1 has returned to a quiescent state. Transducer C1 may therefore be used immediately after time $t_3$ to receive any return echo from the target. As is well known in the art, a return echo induces oscillations in transducer C1. The corresponding output signal $V_o$ may advantageously be obtained at terminal T3.

Figure 5:
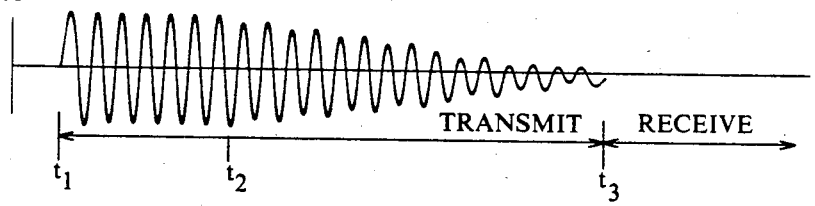
FIG. 5 is a graph showing a representative operating waveform of prior ultrasonic ranging systems.

Referring to FIG. 5, the graph shows a waveform representative of transducer operation in prior ultrasonic ranging systems. When the driving energy is turned off at time $t_2$, the transducer continues to oscillate irregularly or "ring". The ringing is due primarily to the mechanical inertia of the transducer. Since the receive cycle cannot begin until after the ringing stops at time $t_3$, prior ultrasonic ranging systems can only measure a minimum distance of about one foot.

On the other hand, the present invention includes an active damping arrangement. Active damping means that energy from the transducer and oscillator elements is extracted or dissipated by circuit means, such as the above described amplifier feedback circuit, which is itself a source of electrical energy. In prior systems, the damping is passive, that is, the transducer energy is dissipated only through mechanical and electrical resistance. Advantageously, active damping returns the transducer and oscillator elements to a quiescent condition much more rapidly, thereby achieving a minimum ranging distance of less than 1 inch. In addition, active damping makes it possible to include the transducer within the resonant circuit used to drive the transducer, as shown in FIG. 1. A higher signal-to-noise ratio is thereby achieved over prior arrangements in which the transducer itself is not part of a resonant circuit. A high signal-to-noise ratio increases sensitivity with respect to the detection of small objects. The present transducer driving arrangement is also more efficient; prior ranging systems may consume on the order of a hundred times more power.

Figure 3:
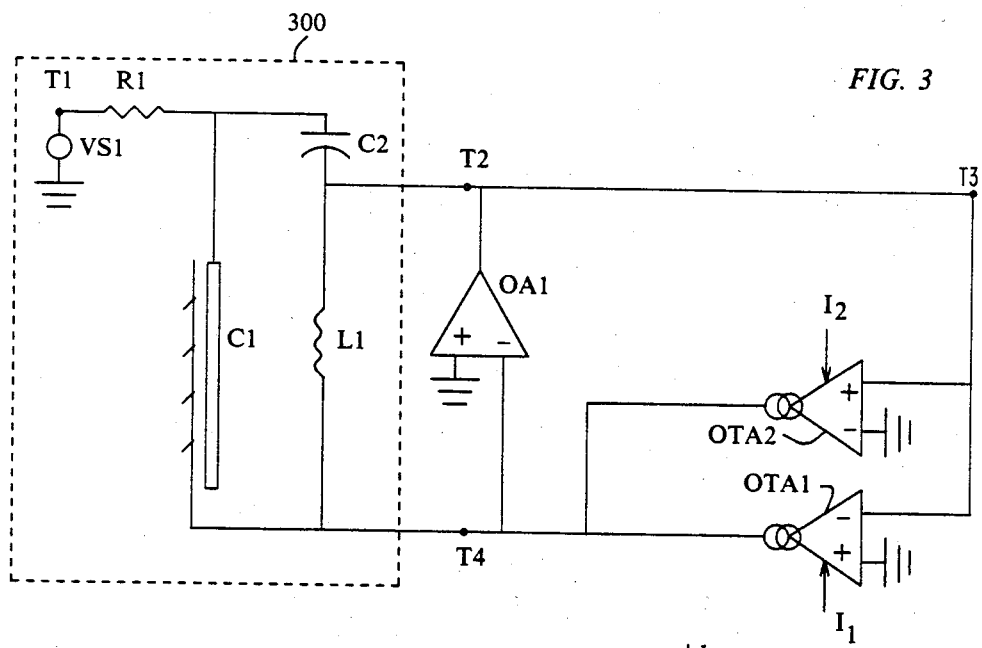
FIG. 3 is a schematic diagram of another circuit illustrative of the invention.

Referring to FIG. 3, an alternative resonant circuit is shown connected to a time-dependent conductance circuit similar to the one described in detail above. The conductance circuit is the same as previously described except that the driving amplifier OTA1 is connected for negative feedback (instead of positive) and the damping amplifier OTA2 is connected for positive feedback (instead of negative). The alternative resonant circuit comprises an operational amplifier OA1 having a positive input terminal connected to ground and a negative input terminal connected to the outputs of amplifiers OTA1 and OTA2. Since the output terminals of amplifiers OTA1 and OTA2 are connected to the negative or inverting terminal of amplifier OA1, operation of the circuit responsive to currents $I_1$ and $I_2$ is the same as described above with reference to FIG. 1. The negative input terminal of amplifier OA1 is also connected to one side of transducer C1 and inductor L1. The other side of transducer C1 is connected to capacitor C2, and to terminal T1 via resistor R1. The other side of inductor L1 is connected to the other side of capacitor C2, the output terminal of amplifier OA1, and terminal T2. In addition, the protective circuit of FIG. 8, discussed above, may be substituted between terminals T2 and T3 of the alternative resonant circuit. Advantageously, the alternative resonant circuit achieves a wide voltage swing across the transducer to produce a correspondingly strong acoustic wave.

Figure 7:
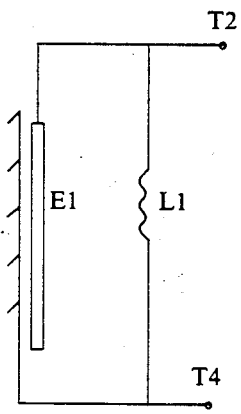
FIG. 7 is a schematic diagram of an alternative transducer arrangement useful in the embodiment of FIG. 3.

An electret may be substituted for the transducer arrangement shown in box 300 of FIG. 3. Referring to FIG. 7, one terminal of electret E1 is connected to one side of inductor L1 and terminal T2. The other terminal of the electret is connected to the other side of the inductor and to terminal T4.

Figure 9:
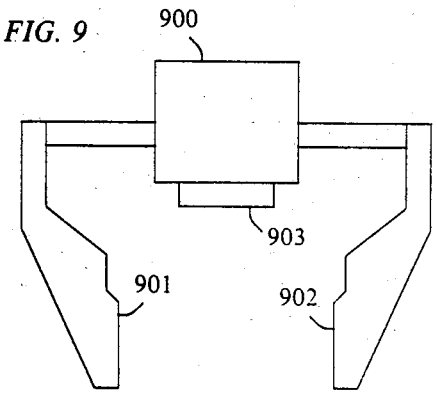
FIG. 9 is a top view of a robot gripper fitted with a ranging transducer illustrative of the invention.

Referring to FIG. 9, an acoustic ranging transducer 903 in accordance with the invention may be fitted to a robotic hand or gripper 900. The oscillator and control circuitry (not shown) may be located remotely. The gripper includes jaws 901 and 902. Ranging transducer 903 thereby provides a target homing capability. Distance information from the ranging system may be used for feedback control of gripper positioning whereby jaws 901 and 902 may be controlled to clasp a target object accurately.

While the invention has been shown and described with reference to a preferred embodiment, various modifications and changes may be made by one skilled in the art without departing from the spirit and scope of the invention. In FIG. 4, for example, a series resistor and a capacitor connected to ground may be provided on the collector of transistor T2 whereby current $I_2$ will decay more slowly at time $t_3$. In FIG. 1, a small voltage offset may be applied to the positive input terminal of amplifier OTA2. These modifications further improve the speed with which the system returns to a quiescent state following the transmit burst. In addition, various component values may be alerted to change the operating characteristics.

What is claimed is:

1. An acoustic ranging system comprising:
    a resonant circuit;
    a transducer connected to the resonant circuit, the transducer being alternately operative in the transmit and receive cycles of the ranging system; and
    means for controlling the resonant circuit during the transmit cycle including means for applying energy to drive the resonant circuit; and
    means responsive to a signal from said resonant circuit for selectively extracting energy from said resonant circuit;
    said means for applying energy to drive the resonant circuit comprises transconductance means having an input connected to said resonant circuit and an output connected to said resonant circuit and means for operating said transconductance means in positive feedback mode, and
    said means for extracting energy comprises said transconductance means and means for operating said transconductance means in negative feedback mode, said transconductance means being responsive to a signal on its input from said resonant circuit to supply a signal to its output for removing energy from said resonant circuit.

2. Apparatus as in claim 1 wherein the transconductance means comprises
    a first operational transconductance amplifier having a positive input terminal and an output terminal, the positive input terminal and the output terminal being connected to the resonant circuit.

3. Apparatus as in claim 2 wherein said transconductance means further comprises a second operational transconductance amplifier having a negative input terminal and an output terminal, the negative input terminal and the output terminal being connected to the resonant circuit.

4. An acoustic ranging system comprising:
    a resonant circuit;
    a transducer connected to the resonant circuit, the transducer being alternately operative in the transmit and receive cycles of the ranging system; and
    means for controlling the resonant circuit during the transmit cycle including means for applying energy to drive the resonant circuit whereby the transducer generates acoustic waves, and means for actively extracting energy from the resonant circuit whereby the resonant circuit is damped to a quiescent state;
    said means for applying energy to drive the resonant circuit and the means for extracting energy from the resonant circuit comprises a conductance circuit sequentially operative in positive and negative feedback modes;
    said conductance circuit comprising a first transconductance amplifier having a positive input terminal and an output terminal, the positive input terminal and the output terminal being connected to the resonant circuit, and a second operational transconductance amplifier having a negative input terminal and an output terminal, the negative input terminal and the output terminal being connected to the resonant circuit.

5. Apparatus as in claim 4 wherein the means for controlling the resonant circuit further comprises
    means for limiting the voltage applied to the first and second transconductance amplifiers, the voltage limiting means being connected between the resonant circuit and the input terminals of the first and second transconductance amplifiers.

6. Apparatus as in claim 5 wherein the voltage limiting means comprises
    first and second current sources, each current source having positive and negative terminals, the positive terminal of the first current source and the negative terminal of the second current source being connected to ground;
    first, second, third, and fourth diodes, the anodes of the first and second diodes being connected to the negative terminal of the first current source; the cathode of the first diode being connected to the anode of the third diode and the resonant circuit; the cathode of the second diode being connected to the anode of the fourth diode, the positive input terminal of the first transconductance amplifier and the negative input terminal of the second transconductance amplifier; the cathodes of the third and fourth diodes being connected to the positive terminal of the second current source; and
    fifth and sixth diodes, the anode of the fifth diode and the cathode of the sixth diode being connected to the junction between the second and fourth diodes, the cathode of the fifth diode and the anode of the sixth diode being connected to ground, 7. Apparatus as in claim 4 wherein the transducer is a capacitive device having first and second terminals, the second terminal of the transducer being connected to ground; and
    the resonant circuit further comprises an inductor and a capacitor connected in series between the first and second terminals of the transducer, the junction between the inductor and capacitor being connected to the input and output terminals of the transconductance amplifiers.

8. Apparatus as in claim 7 wherein the ranging system further comprises means for applying a bias voltage to the transducer.

9. Apparatus as in claim 8 wherein the bias voltage applying means comprises a voltage source, and a resistor connected in series between the voltgage source and the first terminal of the transducer.

10. Apparatus as in claim 4 wherein the transducer is a capacitive device having first and second terminals; and
    the resonant circuit further comprises an inductor and a capacitor connected in series between the first and second terminals of the transducer, and
    an operational amplifier having a negative input terminal and an output terminal; the negative input terminal of the operational amplifier being connected to the second terminal of the transducer and to the output terminals of the transconductance amplifiers; and the output terminal of the operational amplifier being connected to the input terminals of the transconductance amplifiers and to the junction between the inductor and the capacitor.

11. Apparatus as in claim 4 wherein the transducer is an electret having first and second terminals, the second terminal of the electret being connected to ground; and the resonant circuit further comprises an inductor connected between the first and second terminals of the electret, the junction between the inductor and the first terminal of the electret being connected to the input and output terminals of the transconductance amplifiers.

12. Apparatus as in claim 4 wherein the transducer is an electret having first and second terminals; and the resonant circuit further comprises an inductor connected between the first and second terminals of the electret, and an operational amplifier having a negative input terminal and an output terminal; the negative input terminal of the operational amplifier being connected to the second terminal of the electret and to the output terminals of the transconductance amplifiers; and the output terminal of the operational amplifier being connected to the input terminals of the transconductance amplifiers and to the junction between the inductor and the first terminal of the electret.

* * * * *